United States Patent
Choo et al.

(10) Patent No.: US 10,742,865 B2
(45) Date of Patent: Aug. 11, 2020

(54) CONFIGURING COGNITIVE ROBOT VISION

(71) Applicant: International Business Machines Corporation, Armonk, NY (US)

(72) Inventors: Kristina Y. Choo, Chicago, IL (US); Krishnan K. Ramachandran, Campbell, CA (US); Gandhi Sivakumar, Bentleigh (AU)

(73) Assignee: International Business Machines Corporation, Armonk, NY (US)

( * ) Notice: Subject to any disclaimer, the term of this patent is extended or adjusted under 35 U.S.C. 154(b) by 294 days.

(21) Appl. No.: 15/487,677

(22) Filed: Apr. 14, 2017

(65) Prior Publication Data

US 2018/0302549 A1 Oct. 18, 2018

(51) Int. Cl.
| | | |
|---|---|---|
| H04N 5/232 | (2006.01) | |
| H04N 5/247 | (2006.01) | |
| H04N 21/00 | (2011.01) | |

(52) U.S. Cl.
CPC ..... *H04N 5/23203* (2013.01); *H04N 5/23206* (2013.01); *H04N 5/247* (2013.01); *H04N 21/00* (2013.01)

(58) Field of Classification Search
CPC ... H04N 5/23203; H04N 5/247; B25J 13/003; B25J 9/1697; B25J 11/0005; G10L 15/22; G10L 2015/223; G05B 2219/40393
See application file for complete search history.

(56) References Cited

U.S. PATENT DOCUMENTS

| | | | |
|---|---|---|---|
| 4,611,292 A | 9/1986 | Ninomiya et al. | |
| 5,329,469 A | 7/1994 | Wantanabe | |
| 5,506,682 A | 4/1996 | Pryor | |
| 6,408,429 B1 | 6/2002 | Marrion, Jr. et al. | |
| 8,994,776 B2 | 3/2015 | Sutherland et al. | |
| 2007/0112462 A1 | 5/2007 | Kim et al. | |
| 2016/0267759 A1* | 9/2016 | Kerzner | G08B 13/19645 |
| 2017/0071681 A1* | 3/2017 | Peine | A61B 90/361 |
| 2018/0243915 A1* | 8/2018 | Hashimoto | B23P 19/04 |

FOREIGN PATENT DOCUMENTS

| | | |
|---|---|---|
| CN | 1490594 A | 4/2004 |
| CN | 103279949 B | 10/2015 |

OTHER PUBLICATIONS

Fenn et al., "Addressing the non-functional requirements of computer vision systems: A case study", Preprint submitted to Journal of Systems and Software, Nov. 3, 2014, 19 pages, <http://arxiv.org/abs/1410.8623>.

(Continued)

*Primary Examiner* — Twyler L Haskins
*Assistant Examiner* — Angel L Garces-Rivera
(74) *Attorney, Agent, or Firm* — Edward J. Wixted, III

(57) ABSTRACT

In an approach to robot vision configuration, one or more computer processors receive a command for image capture by a robot. The one or more computer processors determine one or more cameras of a plurality of cameras to respond to the command. The one or more computer processors configure the one or more cameras to respond to the command.

15 Claims, 5 Drawing Sheets

(56) References Cited

OTHER PUBLICATIONS

Pirahansiah, "Camera calibration of multi-modal robot vision based on image quality assessment", Conference Paper, Jun. 2015, 7 pages, <http://ieeexplore.ieee.org/xpl/articleDetails.jsp?arnumber=7360336&queryText=multi%20camera%20vision%20robots&newsearch=true>.

Ramsgaard et al., "Mirror-Based Trinocular Systems in Robot-Vision", Proceedings 15th International Conference on Pattern Recognition, Sep. 3-7, 2000, pp. 499-502, <http://ieeexplore.ieee.org/xpl/articleDetails.jsp?arnumber=902966&queryText=multi%20camera%20vision%20robots&pageNumber=2&newsearch=true>.

Ryu et al., "Robust Feature Detection for a Mobile Robot using a Multi-View Single Camera", 2008 IEEE/SCIE International Symposium on System Integration, Dec. 4, 2008, pp. 105-110, <http://ieeexplore.ieee.org/xpl/articleDetails.jsp?arnumber=4770435&queryText=multi%20camera%20vision%20robots&pageNumber=2&newsearch=true>.

Tuzel et al., "Finding a needle in a specular haystack", Conference Paper in Proceedings—IEEE International Conference on Robotics and Automation, Jun. 2011, 9 pages, <http://ieeexplore.ieee.org/xpl/articleDetails.jsp?arnumber=5979857&queryText=multi%20camera%20vision%20robots&pageNumber=2&newsearch=true>.

Mell et al., "The NIST Definition of Cloud Computing", National Institute of Standards and Technology, U.S. Department of Commerce, NIST Special Publication 800-145, Sep. 2011, 7 pages.

\* cited by examiner

CONFIGURING COGNITIVE ROBOT VISION

BACKGROUND OF THE INVENTION

The present invention relates generally to the field of cognitive robotics, and more particularly to configuring cognitive robot vision.

Currently, many industries are trending toward cognitive models enabled by big data platforms and machine learning. Cognitive models, also referred to as cognitive entities, are designed to remember the past, interact with humans, continuously learn, and continuously refine responses for the future with increasing levels of prediction. An example of a cognitive model interface is a cognitive robot. Cognitive robotics is concerned with endowing a robot with intelligent behavior by providing it with a processing architecture that will allow it to learn and reason about how to behave in response to complex goals in a complex world.

Cameras may be used as small, inexpensive sensors with low power consumption, which makes them suitable for large scale employment in commercial products such as robotic toys and security robots. Various types of cameras, including pin-hole, stereo, omni-directional and non-central cameras, have been used in robot vision. These vision systems may possess the characteristics of either narrow or wide fields of view.

The internet of things (IoT) is the internetworking of physical devices (also referred to as "connected devices" and "smart devices"), vehicles, buildings, and other items, embedded with electronics, software, sensors, actuators, and network connectivity that enable these objects to collect and exchange data. The IoT allows objects to be sensed and/or controlled remotely across existing network infrastructure, creating opportunities for more direct integration of the physical world into computer-based systems, and resulting in improved efficiency, accuracy, and economic benefit in addition to reduced human intervention. Each thing is uniquely identifiable through its embedded computing system but is able to interoperate within the existing Internet infrastructure.

SUMMARY

Embodiments of the present invention disclose a method, a computer program product, and a system for robot vision configuration. The method may include one or more computer processors receiving a command for image capture by a robot. The one or more computer processors determine one or more cameras of a plurality of cameras to respond to the command. The one or more computer processors configure the one or more cameras to respond to the command.

DETAILED DESCRIPTION

A cognitive robot (CR) is expected to naturally interact with humans, learn concepts and behaviors, and become a part of a human community. A CR is built with software components integrated with kinematic gesture components, resulting in a robot that responds and moves by perceiving signals through sensors, audio interfaces, visual interfaces, etc. For a CR to be considered a cognitive companion, serving as a supplement for performing many human functions, the CR is expected to deliver at least the same level of accuracy, quality, and throughput as may be delivered by a human. In addition, a CR is expected to possess the capabilities of cognition embodiment, i.e., intelligence, and cognition amplification, i.e., multiple cognitive solutions working together for multiplied intelligence. Embodiments of the present invention recognize that improvements to CR visual intelligence may be made by providing a control program for CR cognitive vision which can configure a plurality of cameras to optimize CR vision. Implementation of embodiments of the invention may take a variety of forms, and exemplary implementation details are discussed subsequently with reference to the Figures.

Figure 1:
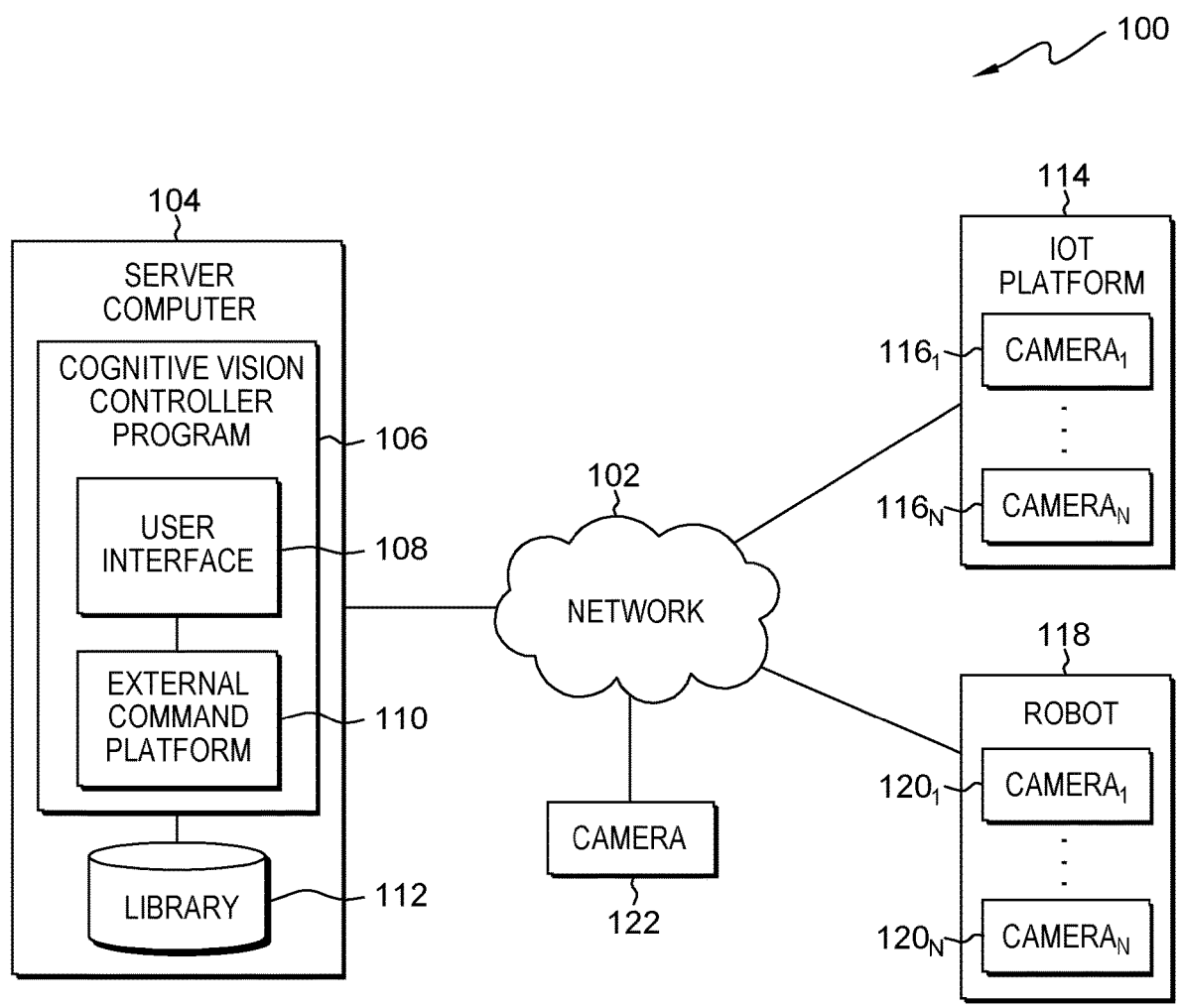
FIG. 1 is a functional block diagram illustrating a distributed data processing environment, in accordance with an embodiment of the present invention.

FIG. 1 is a functional block diagram illustrating a distributed data processing environment, generally designated 100, in accordance with one embodiment of the present invention. The term "distributed" as used herein describes a computer system that includes multiple, physically distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Distributed data processing environment 100 includes server computer 104, internet of things (IoT) platform 114, robot 118, and camera 122, all interconnected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 104, IoT platform 114, robot 118, camera 122, and other computing devices (not shown) within distributed data processing environment 100.

Server computer 104 can be a standalone computing device, a management server, a web server, a mobile computing device, or any other electronic device or computing system capable of receiving, sending, and processing data. In other embodiments, server computer 104 can represent a server computing system utilizing multiple computers as a server system, such as in a cloud computing environment. In another embodiment, server computer 104 can be a laptop computer, a tablet computer, a netbook computer, a personal computer (PC), a desktop computer, a personal digital assistant (PDA), a smart phone, or any other programmable electronic device capable of communicating with IoT platform 114, robot 118, camera 122, and other computing devices (not shown) within distributed data processing environment 100 via network 102. In another embodiment, server computer 104 represents a computing system utilizing clustered computers and components (e.g., database server computers, application server computers, etc.) that act as a single pool of seamless resources when accessed within distributed data processing environment 100. Server computer 104 includes cognitive vision controller program 106 and library 112. Server computer 104 may include internal and external hardware components, as depicted and described in further detail with respect to FIG. 3.

Cognitive vision controller program 106 provides a cognitive amplification of robot vision systems with a GUI-based interface that can integrate with back-end platforms to configure a plurality of cameras, either incorporated as a part of the robot itself or external to the robot to optimize CR vision. Cognitive vision controller program 106 may be configured to control a plurality of different types of robots with differing vision system capabilities. Cognitive vision controller program 106 receives a command or an external condition which specifies a robot vision requirement. Cognitive vision controller program 106 then determines which cameras within distributed data processing environment 100 are needed to respond to the command or condition, and configures the appropriate cameras. In one embodiment, cognitive vision controller program 106 may select a particular robot from a library of robots based on the camera requirements. In the depicted embodiment, cognitive vision controller program 106 resides on server computer 104. In another embodiment, cognitive vision controller program 106 may reside on robot 118 or elsewhere within distributed data processing environment 100, provided cognitive vision controller program 106 has access to IoT platform 114, robot 118, and camera 122, via network 102. Cognitive vision controller program 106 is depicted and described in further detail with respect to FIG. 2.

User interface 108 provides an interface to cognitive vision controller program 106 on server computer 104 for a user to define vision system camera configurations for robot 118. In one embodiment, user interface 108 may be a graphical user interface (GUI) and can display text, documents, web browser windows, user options, application interfaces, and instructions for operation, and include the information (such as graphic, text, and sound) that a program presents to a user and the control sequences the user employs to control the program. In another embodiment, user interface 108 may also be mobile application software that provides an interface to cognitive vision controller program 106 on server computer 104. Mobile application software, or an "app," is a computer program designed to run on smart phones, tablet computers and other mobile devices. User interface 108 enables the user to define a library of robots with varying vision capabilities. User interface 108 may also enable the user to define a palette of various types of vision cameras for use by one or more robots. The palette may include, for example, cameras physically integrated into the robot, as well as external cameras located within distributed data processing environment 100. In a model of a family of robots, various cameras with differing capabilities exist. User interface 108 may also enable the user to define relevant cameras for one or more robots within a family or across families. For a particular model, one or more robots and the associated cameras may be eligible for configuration. For example, user interface 108 can provide the user with a list of eligible robots and the cameras available for configuration. In the example, a user can "drag and drop" relevant cameras from the palette, such as nearby security cameras, to the appropriate robot vision system.

External command platform 110 includes the ability to accept a user's commands for robot 118 via audio input (received and configured using natural language processing), visual input, and other non-text methods of receiving a command known in the art, and translate the command such that robot 118 receives specific, technical instructions, using techniques known in the art.

Library 112 is a repository for data used by cognitive vision controller program 106. In the depicted embodiment, library 112 resides on server computer 104. In another embodiment, library 112 may reside elsewhere within distributed data processing environment 100 provided cognitive vision controller program 106 has access to library 112. Library 112 may be a database, i.e., an organized collection of data. Library 112 can be implemented with any type of storage device capable of storing data and configuration files that can be accessed and utilized by cognitive vision controller program 106, such as a database server, a hard disk drive, or a flash memory. Library 112 stores a library of robots with varying vision capabilities. In one embodiment, library 112 includes a default list of robots within distributed data processing environment 100. In another embodiment, library 112 may include additional robots added by a user via user interface 108. Library 112 may also store a palette of various types of vision cameras for use by one or more robots. The palette of cameras may include metadata associated with each camera, including, but not limited to, manufacturer and capability specifications. Library 112 may also store user-defined camera relevancy for one or more robots, for example, which cameras within distributed data processing environment 100 are relevant to the location or purpose of robot 118. Additionally, library 112 may store command response priorities for robot 118 that indicate which commands may be pre-empted by a different command received at the same time.

Internet of things (IoT) platform 114 is a suite of components that enable a) deployment of applications that monitor, manage, and control connected devices and sensors; b) remote data collection from connected devices; and c) independent and secure connectivity between devices. The components may include, but are not limited to, a hardware architecture, an operating system, or a runtime library (not shown). In the depicted embodiment, IoT platform 114 includes camera(s) 116. In another embodiment, IoT platform 114 may include a plurality of other connected computing devices. For example, IoT platform 114 may include home security devices, such as alarms or smoke detectors. In another example, IoT platform 114 may include a home climate control system or various kitchen appliances.

Robot 118 is a machine capable of automatically carrying out a complex series of actions. In one embodiment, robot 118 carries out action in response to computing instructions, also known as commands. In one embodiment, robot 118 is a general purpose autonomous robot. In various embodiments, robot 118 is a cognitive robot, i.e., robot 118 includes a machine learning component (not shown) which enables robot 118 to "remember" task outcomes and use that data to influence future task performance. In one embodiment, robot 118 is guided by an external control device. In another embodiment, robot 118 may be guided by an internal control device. In one embodiment, robot 118 may be constructed to take on human form. In an embodiment, robot 118 may include an aerial device capable of powered flight or gliding. Robot 118 includes camera(s) 120. Robot 118 may also include a plurality of sensors, microphones, speakers, a global positioning system (GPS), etc. that can receive and react to commands and sensory stimuli.

Camera $116_{1-N}$, herein camera(s) 116, camera $120_{1-N}$, herein camera(s) 120, and camera 122 are each one or more of a plurality of cameras within distributed data processing environment 100 which capture images to provide vision for robot 118. Camera(s) 116, camera(s) 120 and camera 122 may be various types of cameras, including, but not limited to, pin-hole, stereo, omni-directional, non-central, infrared, video, digital, three dimensional, panoramic, filter-based, wide-field, narrow-field, telescopic, microscopic, etc. In some embodiments, camera(s) 116, camera(s) 120 and camera 122 include any device capable of imaging a portion of the electromagnetic spectrum. In one embodiment, camera(s) 116, camera(s) 120 and camera 122 each include a cognitive component (not shown) that enables the cameras to learn commands and to switch functionality. For example, if the command is "Look up," then a cognitive camera can learn that the command means to rotate a motor associated with the camera to a particular angle. Camera(s) 116 reside on IoT platform 114, and represent connected devices, for example, a home security camera. In one embodiment, camera(s) 120 within robot 118 serve as a compound eye for robot 118, where a variety of different cameras have different functions for robot 118. For example, camera $120_1$ may capture still images, camera $120_2$ may capture video images, and camera $120_N$ may be an infrared camera for capturing images at night. As used herein, N represents a positive integer, and accordingly the number of scenarios implemented in a given embodiment of the present invention is not limited to those depicted in FIG. 1. Camera 122 may be a camera positioned in a remote location that is associated, either solely or partially, with robot 118. For example, if camera 122 is solely associated with robot 118, then camera 122 dedicates services to robot 118. In another example, if camera 122 is partially associated with robot 118, then robot 118 may use camera 122 in specific situations or conditions, such as related to a particular time or event.

Figure 2:
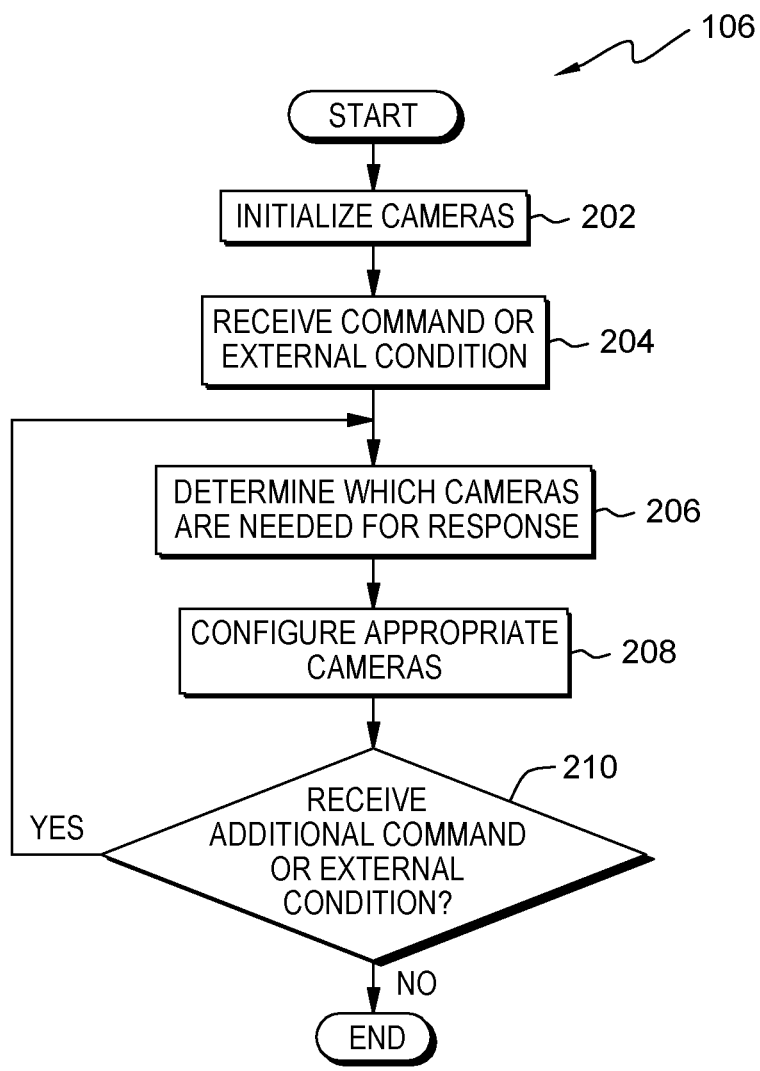
FIG. 2 is a flowchart depicting operational steps of a cognitive vision controller program, on a server computer within the distributed data processing environment of FIG. 1, for configuring robot vision cameras, in accordance with an embodiment of the present invention.

FIG. 2 is a flowchart depicting operational steps of cognitive vision controller program 106, on server computer 104 within distributed data processing environment 100 of FIG. 1, for configuring robot vision cameras, in accordance with an embodiment of the present invention.

Cognitive vision controller program 106 initializes cameras (step 202). In one embodiment, cognitive vision controller program 106 sets camera(s) 120 in a default physical position such that robot 118 can respond to incoming commands without having to execute additional instructions. In another embodiment, cognitive vision controller program 106 sets any computing functions within camera(s) 120 to a ready state such that robot 118 can respond to incoming commands without delay. In a further embodiment, cognitive vision controller program 106 sets camera(s) 116 to a default physical position. In yet another embodiment, cognitive vision controller program 106 sets any computing functions within camera(s) 116 to a ready state. In another embodiment, cognitive vision controller program 106 sets camera 122 in a default physical position. In yet another embodiment, cognitive vision controller program 106 sets any computing functions within camera 122 to a ready state.

Cognitive vision controller program 106 receives a command or external condition (step 204). The user of cognitive vision controller program 106 may provide a command for a vision system action to cognitive vision controller program 106 via user interface 108. In one embodiment, the user speaks a verbose command and cognitive vision controller program 106 utilizes external command platform 110 to receive the command via natural language processing techniques known in the art. For example, the user may speak a command such as "Zoom in on the person's face" or "Record the baseball game." In another embodiment, cognitive vision controller program 106 may receive the command via a text entry into user interface 108. In a further embodiment, cognitive vision controller program 106 may receive a command when the user displays a sign to robot 118, and camera(s) 120 in robot 118 transmit the words or symbols on the sign to external command platform 110 via network 102. In another embodiment, cognitive vision controller program 106 may receive a command automatically. For example, if robot 118 is required to capture a still image of a particular doorway every hour on the hour, then cognitive vision controller program 106 may receive the command automatically, without a user's ongoing intervention. Cognitive vision controller program 106 may determine a plurality of external conditions that prompt a need for a vision system action. For example, if cognitive vision controller program 106 senses complete darkness, then cognitive vision controller program 106 may determine that a change in cameras is needed. In an embodiment where robot 118 includes one or more sensors (not shown) to receive external conditions, robot 118 may sense an external condition, respond with an appropriate vision system action, and communicate the action to cognitive vision controller program 106, via network 102. For example, if robot 118 includes a smoke detector, and the smoke detector detects smoke, then robot 118 may respond by initiating an infrared camera to capture an image of the origin of the smoke, and sending the vision configuration to cognitive vision controller program 106. In an embodiment, cognitive vision controller program 106 may receive an external condition from one or more sensors within IoT platform 114. For example, if a locked door is opened by an unauthorized user, triggering a security alarm within IoT platform 114 to go off, then cognitive vision controller program 106 receives the alarm.

Cognitive vision controller program 106 determines which cameras are needed for a response (step 206). Cognitive vision controller program 106 may determine that one or more integrated cameras, such as camera(s) 120 are needed for the response. Cognitive vision controller program 106 may also determine that one or more IoT cameras, such as camera(s) 116, are needed for the response. Additionally, cognitive vision controller program 106 may determine a remote camera, such as camera 122, is needed for the response. In response to a command, cognitive vision controller program 106 uses external command platform 110 to translate the command into instructions for robot 118 to capture a particular image. For example, if the received command is "Record the baseball game," then cognitive vision controller program 106 determines a video recording camera that can capture motion and is facing the baseball field, such as camera $120_1$, is needed for the response. In response to determining various external conditions, cognitive vision controller program 106 may determine an appropriate response based on pre-defined parameters stored in library 112. For example, if loud noises are occurring in the middle of the night, cognitive vision controller program 106 may determine that one or more security cameras in proximity to robot 118, such as camera(s) 116, are needed to help a user determine the source of the noise. In another example, if a security alarm within IoT platform 114 goes off, then cognitive vision controller program 106 receives the alarm and determines which one or more cameras of camera(s) 116 and camera(s) 120 to turn toward the location of the alarm.

Cognitive vision controller program 106 configures the appropriate cameras (step 208). Cognitive vision controller program 106 reviews the palette of available cameras within distributed data processing environment 100, as stored in library 112, and selects one or more cameras to configure for a response to the received command or the external condition. For example, if the command or condition requires capturing an image in the distance, then cognitive vision controller program 106 configures a camera with zooming capability or a binocular lens. In an embodiment, if more than one command or external condition are received simultaneously, then cognitive vision controller program 106 may configure a plurality of cameras with differing capabilities.

In one embodiment, cognitive vision controller program 106 may pre-empt an action currently in progress such that robot 118 can respond to a newly received command. For example, if cognitive vision controller program 106 receives the command "Look behind you!" while robot 118 is responding to a command requiring a forward-facing camera, such as camera $120_1$, then cognitive vision controller program 106 may pause, or pre-empt, the response to the forward-facing command and prioritize a response to configure a rear-facing camera within robot 118, such as camera $120_2$, to immediately capture an image. Response priorities may be stored in library 112.

Cognitive vision controller program 106 determines whether an additional command or external condition is received (decision block 210). Cognitive vision controller program 106 continues monitoring for any additional commands or changes in external conditions.

If cognitive vision controller program 106 determines an additional command or external condition is received ("yes" branch, decision block 210), then cognitive vision controller program 106 returns to step 206 to determine which cameras are needed for the response. If cognitive vision controller program 106 determines an additional command or external condition is not received ("no" branch, decision block 210), then cognitive vision controller program 106 ends.

Figure 3:
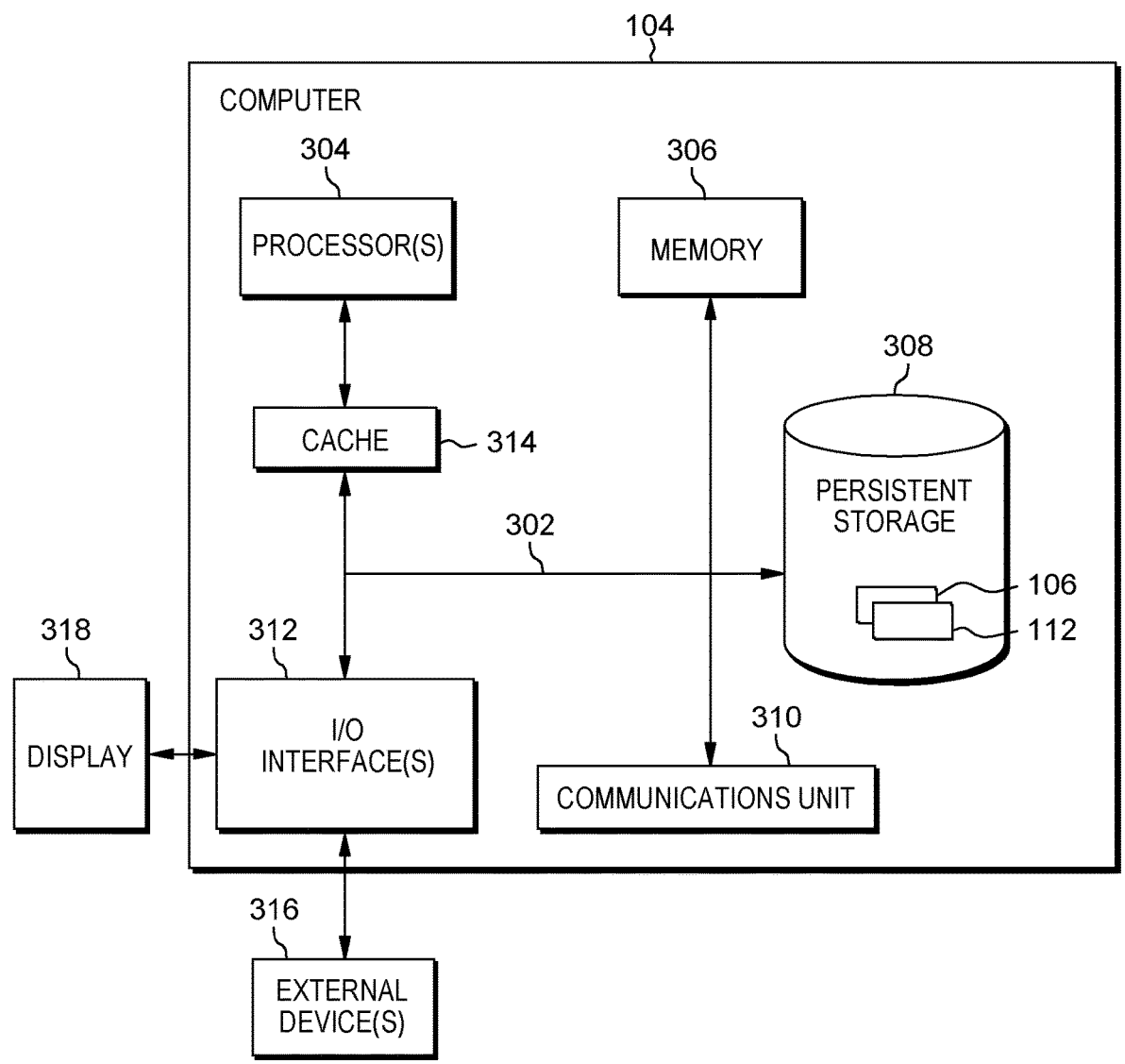
FIG. 3 depicts a block diagram of components of the server computer executing the cognitive vision controller program within the distributed data processing environment of FIG. 1, in accordance with an embodiment of the present invention.

FIG. 3 depicts a block diagram of components of server computer 104 within distributed data processing environment 100 of FIG. 1, in accordance with an embodiment of the present invention. It should be appreciated that FIG. 3 provides only an illustration of one implementation and does not imply any limitations with regard to the environments in which different embodiments can be implemented. Many modifications to the depicted environment can be made.

Server computer 104 can include processor(s) 304, cache 314, memory 306, persistent storage 308, communications unit 310, input/output (I/O) interface(s) 312 and communications fabric 302. Communications fabric 302 provides communications between cache 314, memory 306, persistent storage 308, communications unit 310, and input/output (I/O) interface(s) 312. Communications fabric 302 can be implemented with any architecture designed for passing data and/or control information between processors (such as microprocessors, communications and network processors, etc.), system memory, peripheral devices, and any other hardware components within a system. For example, communications fabric 302 can be implemented with one or more buses.

Memory 306 and persistent storage 308 are computer readable storage media. In this embodiment, memory 306 includes random access memory (RAM). In general, memory 306 can include any suitable volatile or non-volatile computer readable storage media. Cache 314 is a fast memory that enhances the performance of processor(s) 304 by holding recently accessed data, and data near recently accessed data, from memory 306.

Program instructions and data used to practice embodiments of the present invention, e.g., cognitive vision controller program 106 and library 112, are stored in persistent storage 308 for execution and/or access by one or more of the respective processor(s) 304 of server computer 104 via cache 314. In this embodiment, persistent storage 308 includes a magnetic hard disk drive. Alternatively, or in addition to a magnetic hard disk drive, persistent storage 308 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 308 may also be removable. For example, a removable hard drive may be used for persistent storage 308. Other examples include optical and magnetic disks, thumb drives, and smart cards that are inserted into a drive for transfer onto another computer readable storage medium that is also part of persistent storage 308.

Communications unit 310, in these examples, provides for communications with other data processing systems or devices, including resources of IoT platform 114, robot 118, and camera 122. In these examples, communications unit 310 includes one or more network interface cards. Communications unit 310 may provide communications through the use of either or both physical and wireless communications links. Cognitive vision controller program 106, library 112, and other programs and data used for implementation of the present invention, may be downloaded to persistent storage 308 of server computer 104 through communications unit 310.

I/O interface(s) 312 allows for input and output of data with other devices that may be connected to server computer 104. For example, I/O interface(s) 312 may provide a connection to external device(s) 316 such as a keyboard, a keypad, a touch screen, a microphone, a digital camera, and/or some other suitable input device. External device(s) 316 can also include portable computer readable storage media such as, for example, thumb drives, portable optical or magnetic disks, and memory cards. Software and data used to practice embodiments of the present invention, e.g., cognitive vision controller program 106 and library 112 on server computer 104, can be stored on such portable computer readable storage media and can be loaded onto persistent storage 308 via I/O interface(s) 312. I/O interface(s) 312 also connect to a display 318.

Display 318 provides a mechanism to display data to a user and may be, for example, a computer monitor. Display 318 can also function as a touchscreen, such as a display of a tablet computer.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
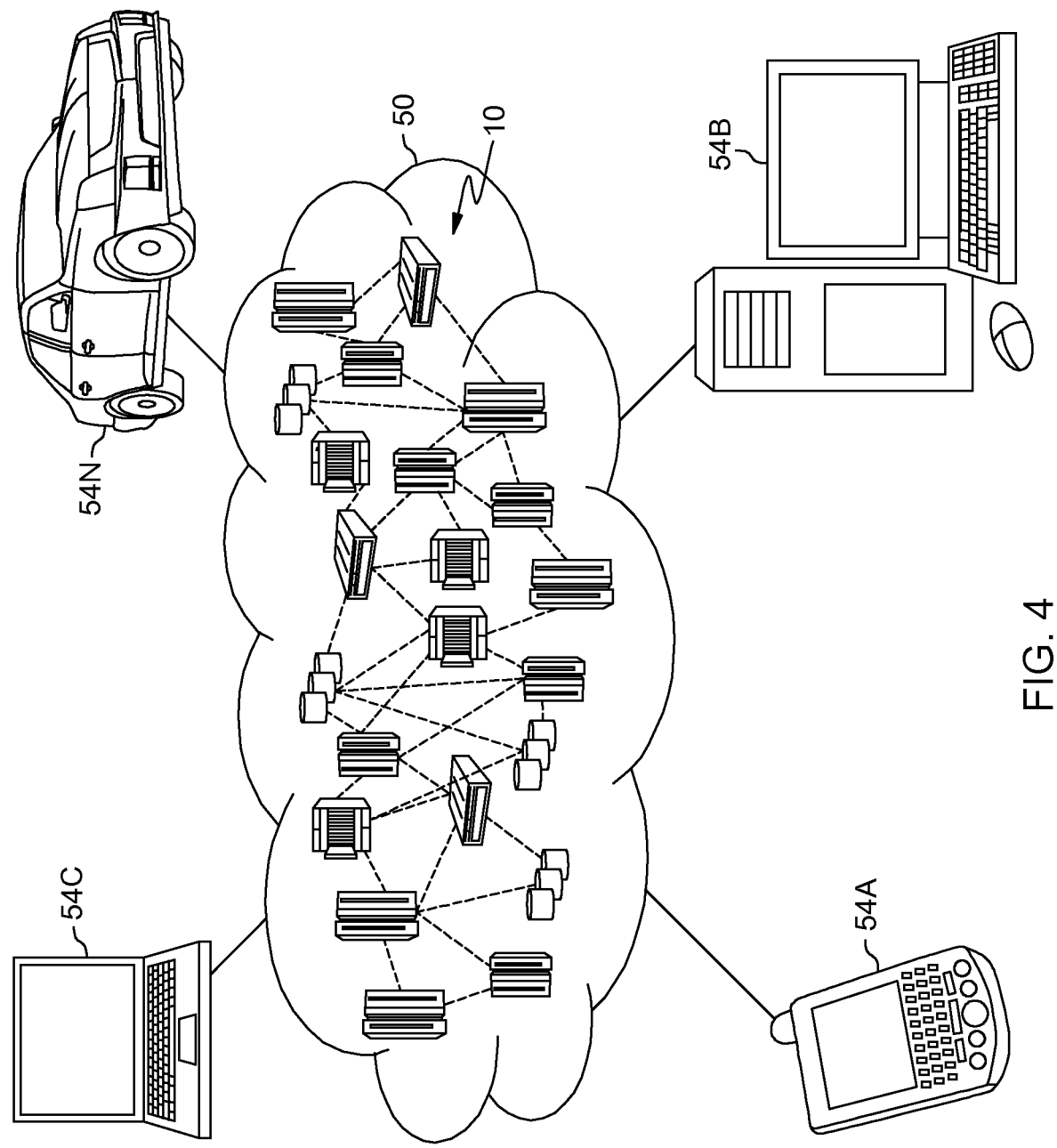
FIG. 4 depicts a cloud computing environment according to an embodiment of the present invention.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
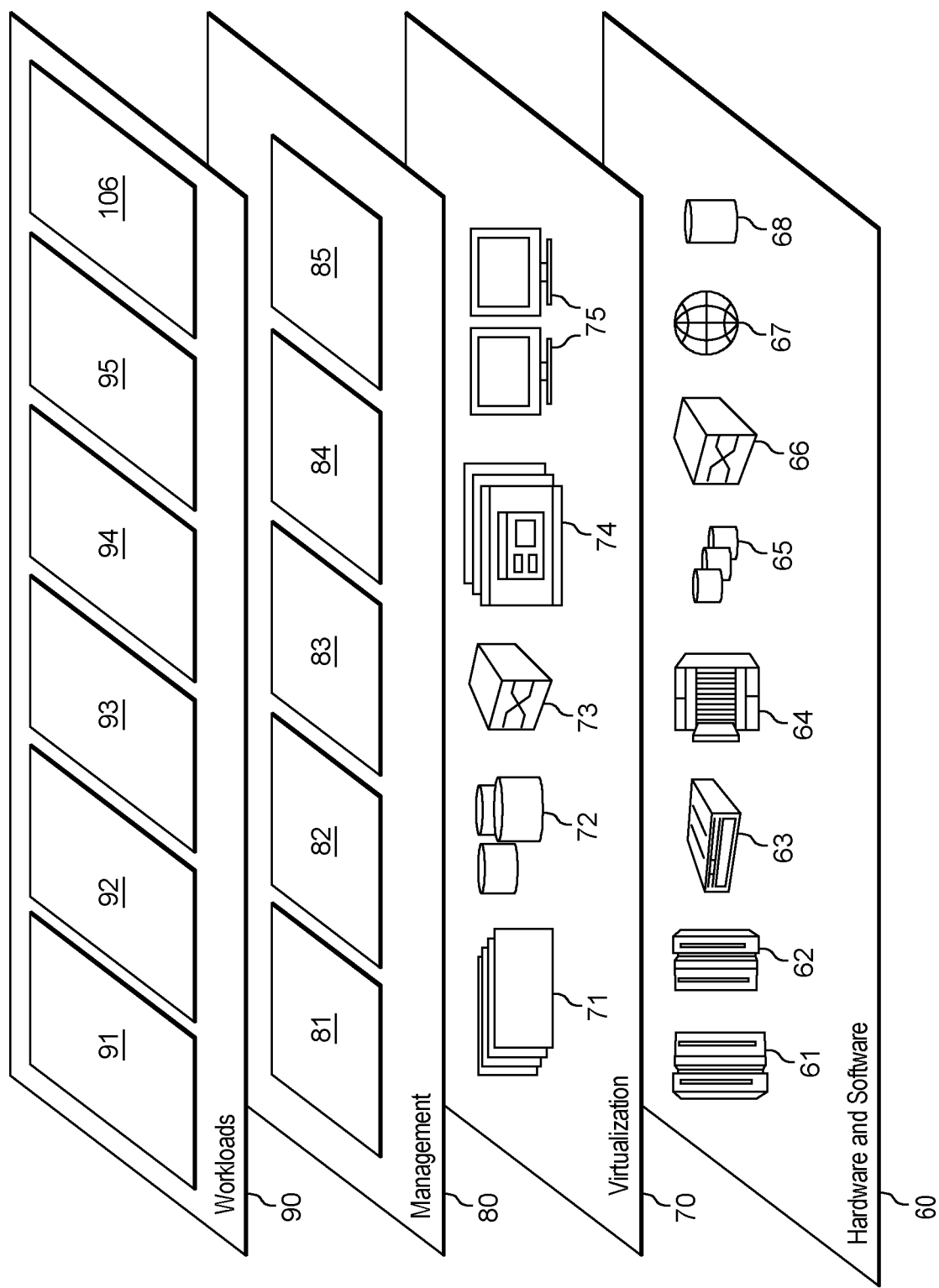
FIG. 5 depicts abstraction model layers according to an embodiment of the present invention.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and cognitive vision controller program 106.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be any tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, a special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, a segment, or a portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method for robot vision configuration, the method comprising:
    receiving, by one or more computer processors, a first command for image capture by a robot;
    determining, by the one or more computer processors, one or more cameras of a plurality of cameras to respond to the first command;
    responsive to determining one or more cameras of a plurality of cameras to respond to the first command, selecting, by the one or more computer processors, one or more robots from a library of robots based, at least in part, on the determined cameras;
    initializing, by the one or more computer processors, the one or more cameras, wherein initializing the one or more cameras comprises setting the one or more cameras in a default physical position and setting one or more computing functions within the one or more cameras to a ready state;
    configuring, by the one or more computer processors, the one or more cameras to respond to the first command;
    receiving, by the one or more computer processors, a second command for image capture by a robot;
    prioritizing, by the one or more computer processors, the second command ahead of the first command;
    pausing, by the one or more computer processors, a response to the first command; and
    configuring, by the one or more computer processors, the one or more cameras to respond to the second command.

2. The method of claim 1, wherein receiving the first command for image capture further comprises determining, by the one or more computer processors, an external condition, wherein the external condition is darkness.

3. The method of claim 1, wherein receiving the first command for image capture further comprises receiving, by the one or more computer processors, a verbose command via natural language processing techniques.

4. The method of claim 1, wherein the plurality of cameras are integrated into at least one of the robot and an internet of things platform external to the robot.

5. The method of claim 1, wherein determining one or more cameras to respond to the first command further comprises:
    reviewing, by the one or more computer processors, a palette of one or more available cameras; and
    selecting, by the one or more computer processors, one or more cameras from the palette to configure for a response to the first command.

6. A computer program product for robot vision configuration, the computer program product comprising:
    one or more computer readable storage devices and program instructions stored on the one or more computer readable storage devices, the stored program instructions comprising:
    program instructions to receive a first command for image capture by a robot;
    program instructions to determine one or more cameras of a plurality of cameras to respond to the first command;
    responsive to determining one or more cameras of a plurality of cameras to respond to the first command, program instructions to select one or more robots from a library of robots based, at least in part, on the determined cameras;
    program instructions to initialize the one or more cameras, wherein program instructions to initialize the one or more cameras comprises program instructions to set the one or more cameras in a default physical position and program instructions to set one or more computing functions within the one or more cameras to a ready state;
    program instructions to configure the one or more cameras to respond to the first command
    program instructions to receive a second command for image capture by a robot;
    program instructions to prioritize the second command ahead of the first command;
    program instructions to pause a response to the first command; and
    program instructions to configure the one or more cameras to respond to the second command.

7. The computer program product of claim 6, wherein the program instructions to receive the first command for image capture comprise program instructions to determine an external condition, wherein the external condition is darkness.

8. The computer program product of claim 6, wherein the program instructions to receive the first command for image capture comprise program instructions to receive a verbose command via natural language processing techniques.

9. The computer program product of claim 6, wherein the plurality of cameras are integrated into at least one of the robot and an internet of things platform external to the robot.

10. The computer program product of claim 6, wherein the program instructions to determine one or more cameras to respond to the first command comprise:
    program instructions to review a palette of one or more available cameras; and program instructions to select one or more cameras from the palette to configure for a response to the first command.

11. A computer system for robot vision configuration, the computer system comprising:

one or more computer processors;

one or more computer readable storage devices;

program instructions stored on the one or more computer readable storage devices for execution by at least one of the one or more computer processors, the stored program instructions comprising:

program instructions to receive a first command for image capture by a robot;

program instructions to determine one or more cameras of a plurality of cameras to respond to the first command;

responsive to determining one or more cameras of a plurality of cameras to respond to the first command, program instructions to select one or more robots from a library of robots based, at least in part, on the determined cameras;

program instructions to initialize the one or more cameras, wherein program instructions to initialize the one or more cameras comprises program instructions to set the one or more cameras in a default physical position and program instructions to set one or more computing functions within the one or more cameras to a ready state;

program instructions to configure the one or more cameras to respond to the first command program instructions to receive a second command for image capture by a robot;

program instructions to prioritize the second command ahead of the first command;

program instructions to pause a response to the first command; and program instructions to configure the one or more cameras to respond to the second command.

12. The computer system of claim 11, wherein the program instructions to receive the first command for image capture comprise program instructions to determine an external condition, wherein the external condition is darkness.

13. The computer system of claim 11, wherein the program instructions to receive the first command for image capture comprise program instructions to receive a verbose command via natural language processing techniques.

14. The computer system of claim 11, wherein the plurality of cameras are integrated into at least one of the robot and an internet of things platform external to the robot.

15. The computer system of claim 11, wherein the program instructions to determine one or more cameras to respond to the first command comprise:

program instructions to review a palette of one or more available cameras; and program instructions to select one or more cameras from the palette to configure for a response to the first command.

* * * * *